United States Patent [19]
Owens

[11] 3,831,896
[45] Aug. 27, 1974

[54] AUXILIARY REAR VIEW MIRROR SYSTEM

[76] Inventor: Clarence C. Owens, 616 S. Vann Ave., Evansville, Ind. 47714

[22] Filed: Oct. 30, 1972

[21] Appl. No.: 302,135

[52] U.S. Cl. .............................................. 248/479
[51] Int. Cl. ............................................... B60r 1/06
[58] Field of Search ........ 248/475 R, 475 A, 475 B, 248/478, 479, 480, 481, 482, 483, 484, 485, 486, 476, 477; 350/307

[56] References Cited
UNITED STATES PATENTS

| | | | |
|---|---|---|---|
| 2,552,074 | 5/1951 | Thompson | 248/480 |
| 3,395,883 | 8/1968 | Murgar | 248/480 |
| 3,415,481 | 12/1968 | Greenfield | 248/486 |

*Primary Examiner*—William H. Schultz
*Attorney, Agent, or Firm*—Hood & Coffey

[57] ABSTRACT

For use on a vehicle, an auxiliary rear view mirror system comprising first, second and third elongated, rod-like support arms, each arm having a proximal end portion and a distal end portion. The distal end portions of the arms are connected together, and a mirror is connected to the distal end portion of at least one of the arms. The proximal end portion of the first arm is connected to the vehicle at a first point adjacent the base of the corner post between the windshield and the front side window. The proximal end portion of the second arm is connected to the vehicle at a second point spaced forwardly of and below the said first point while the proximal end portion of the third arm is connected to the vehicle at a third point spaced forwardly of the first point and above the said second point. In the self-storing embodiment of the invention, the connections of the second and third arms to the vehicle are releasable connections while the connection of the first arm is a permanent jointed connection such that the arms can be folded to extend together along the post in a storage position. In the nonself-storing embodiment, the connections between each of the three arms and the vehicle are manually releasable connections such that the arms can be removed together as an assembly.

31 Claims, 12 Drawing Figures

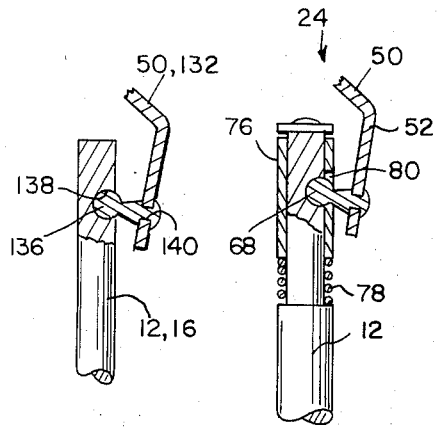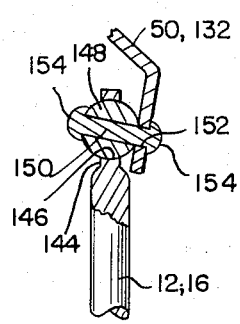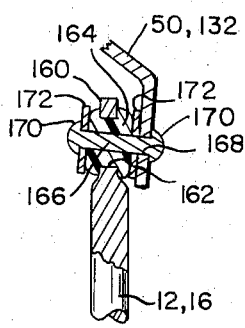
Fig.2  Fig.2a  Fig.3  Fig.4
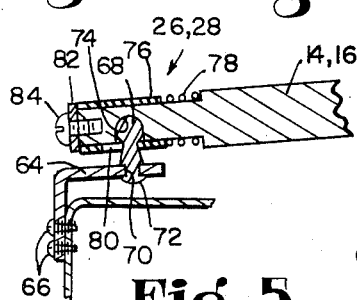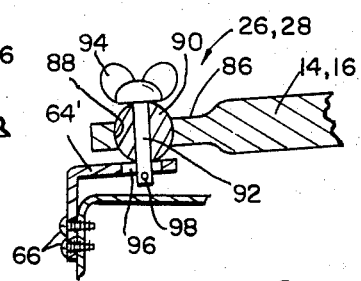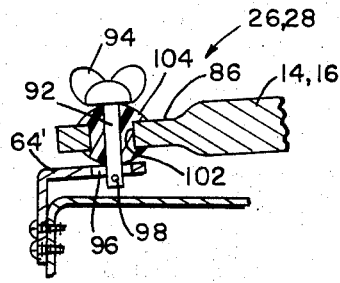
Fig.5  Fig.6  Fig.7
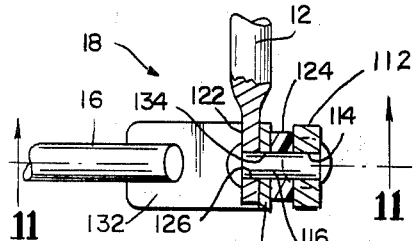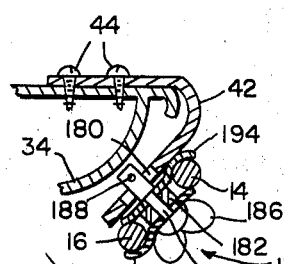
Fig.9  Fig.10
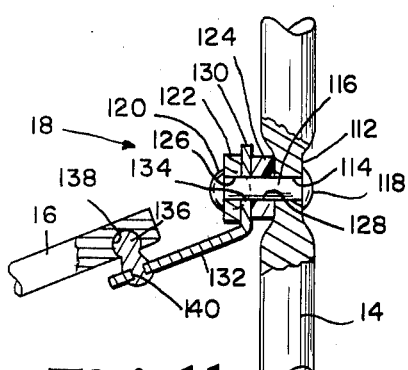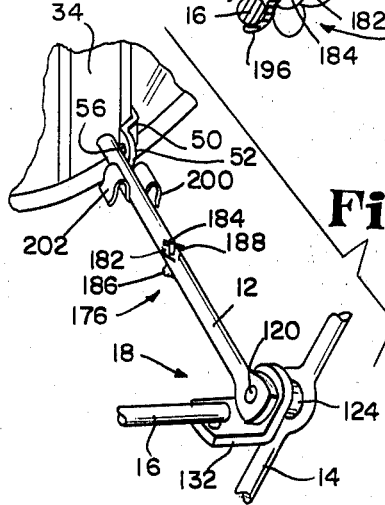
Fig.11  Fig.8

AUXILIARY REAR VIEW MIRROR SYSTEM

The present invention relates to rear view mirror structures for vehicles and, more particularly, to the provision of auxiliary rear view mirror structures for use in towing boats, trailers and the like.

An object of my present invention is to provide an auxiliary rear view mirror system which is so constructed that, when the vehicle is to be used for towing purposes, the system can be simply and quickly secured to the vehicle in a manner which will precisely repeat previous mirror adjustments. Another object of my invention is to provide such a system which is structurally solid rigidly to hold the mirror firm under all driving conditions, and particularly under the wind and vibration stresses caused by driving at high speeds.

Another object of my present invention is to provide such an auxiliary rear view mirror system which is constructed so that, when the vehicle is not being used for towing purposes, the mirror and its supporting structure can be quickly and compactly folded and securely stored on the vehicle to be disposed in a convenient and nonobstructing position.

It is well known that the use of passenger cars, station wagons, pickup trucks and the like to tow travel trailers, horse trailers, mobile homes, boats and the like, which are wider than the pulling vehicle, is on the increase. Each such pulling vehicle must be equipped with auxiliary rear view mirrors so that the driver of the vehicle can see around and behind the towed vehicle. Many types of auxiliary mirrors are on the market and in actual use. Some auxiliary mirrors clamp to the doors, some clamp to the fenders, and some clamp to the hood. Conventionally, the available auxiliary mirrors are of universal design in order to fit the majority of vehicles which might be used for towing purposes. These universally-designed mirrors are usually equipped with "clamp-on type" mounting structures. These conventional rear view mirrors present many major problems and disadvantages which are overcome by the structure of my present invention.

For instance, when any rear view mirror, which is not remotely adjustable, is located beyond arm's length from the driving position, it is very difficult properly to adjust the mirror. The adjusting process conventionally is accomplished by much trial and error with the driver leaving his driving position to move the mirror. Alternatively, the driver can have another person adjust the mirror head at the driver's directions. Most auxiliary mirror heads have tension-adjusting screws around the ball joint such that, if the screws are adequately tightened, the mirror head is locked in an immobile adjusted position. However, with the conventional clamp-on mirrors, it does not help repeatability to lock the head tightly into adjusted position because, each time the mirrors are clamped on the vehicle, the mirror head assumes a different position unless the clamps are placed in exactly the same position they occupied on the vehicle when the mirror was locked. The universal clamp-on designs make it practically impossible to get the mirror supporting structure located in exactly the same location each time. Even variations in clamping device pressure will change the location of the mirror head sufficiently to necessitate readjustment of the mirror head. Generally, drivers become frustrated and correct adjustment is generally sacrificed. This results in an unsafe condition. Further, the time and trouble involved in adjusting the mirrors is such that it is a common practice for many drivers to leave the mirrors in position on their vehicles even though they are not towing a trailer, especially if they intend to tow the trailer in the near future. This also creates an unsafe condition.

Since most conventional rear view mirror structures are designed universally to clamp on various types of vehicles, they are not structurally rigid enough to prevent the mirror head from vibrating. Generally, the universal designs are not constructed such that there can be enough distance between the proximal end portions of their supporting legs to provide for a solid, distortion-free, support for the mirror head. Some conventional mirror structures even rely on the thin and flexible exterior sheet metal of the vehicle for supportive bracing.

The combination of the adjustment problems and the vibration problems is such that conventional auxiliary rear view mirrors are often functionally marginal and even completely inadequate for the purpose intended. There is no greater hazard to highway safety than when a driver who is pulling a trailer must rely on badly adjusted and vibration-distorted images in rear view mirrors. Such a driver cannot safely change lanes, turn off the highway or judge the speed or type of vehicle that is approaching from the rear.

My auxiliary rear view mirror structure has many advantages over the prior art devices discussed above and solves many of the problems discussed above. My mirror structure comprises three rigid, elongated, rod-like arms, each having a proximal end portion and a distal end portion. The distal end portions of the arms are connected together, and the proximal end portions of the arms are connected to the vehicle at spaced apart points. The proximal end portion of the first arm is connected to the vehicle at a first point adjacent to the base of the post between the windshield and the front side window. The proximal end portion of the second arm is connected to the vehicle at a second point spaced forwardly of and below the first point. Then, the proximal end portion of the third arm is connected to the vehicle at a third point spaced forwardly of the first point and above the second point. This third point may preferably be located directly above the second point to provide the maximum displacement of the mirror head from the vehicle. The mirror head, which is preferably mounted on the distal end portion of the second arm, may be positioned closer to the vehicle by positioning the third point forwardly of the second point.

In this description and in the appended claims, the terms "adjacent the base of the post," or "adjacent the base of one of such posts," are intended to refer to the general area of the vehicle surrounding the corner post between the windshield and each front side window. For convenience purposes, this first point may be spaced a short distance forwardly of the base of the post to provide a suitable mounting location.

In my preferred mirror structure, each means for connecting the proximal end portions of the arms to the vehicle is a three-dimensional swivel joint means. In the self-storing embodiment, the means for connecting the proximal end portion of the first arm is a permanent jointed connection such that the first arm is swingably movable between its outwardly extending use position and its storage position adjacent the vehicle, while the means for connecting the proximal end portions of the second and third arms are manually releasable connection means. In such an embodiment, the proximal end portions of the second and third arms can be quickly disconnected from the vehicle to move with the first arm to its storage position. In the nonself-storing embodiment of the present invention, all three means for connecting the proximal end portions of the arms to the vehicle are manually releasable connections or quick disconnect-type connections such that the entire mirror structure can be quickly removed from the vehicle, folded and stored in the trunk or in the vehicle to be pulled.

Importantly, in accordance with my present invention, each manually releasable connection means includes a fixed connector member adapted to be rigidly and permanently attached to the vehicle and a cooperating relatively movable connector member attached to the proximal end portion of the associated arm for movement therewith, the connector members being releasably engageable. For instance, in accordance with my present invention, ball studs may be rigidly and permanently attached to predetermined locations on the vehicle by means such as sheet metal screws or other types of permanent fasteners. Then, a spherical socket for receivably engaging each ball stud is provided on the proximal end portion of the associated arm. Other types of swivel joint connections will be disclosed as this description progresses.

Importantly, since each connection means includes a fixed connector member rigidly and permanently attached to the vehicle, the repeatability problem discussed above is solved. The position of the proximal end portion of each arm is predetermined by the position of the fixed connector member of the connection means for that arm. Each time my mirror structure is assembled to the vehicle, it will accurately assume its desired position to which it has been previously adjusted.

While each connection means is preferably a three-dimensional swivel connection, when all three connection means are made, my mirror structure assumes a stiff and rigid structure which will not move or shift under wind or vibration stresses. The three-dimensional joints, of course, accommodate the various vehicle configurations without sacrificing structural strength and rigidity of the mirror-holding structure.

In the self-storing embodiment, the three support arms may extend parallel to and alongside the conventional post between the windshield and the front side window. In this position, the mirror head will be above the roof and facing rearwardly and downwardly to be protected. Means are provided for clamping the arms in the self-storing position.

Other self-storing positions may be used in accordance with my present invention. For instance, the three arms may extend forwardly from a point adjacent the base of the corner post to be above the fender. Of course, the primary objective in selecting a storage position is to keep the support arms and the mirror head in a position such that they will not obscure vision nor present a hazard.

In this description and in the claims, I have referred to connecting the distal end portions of the support arms together. It will be appreciated, as this description progresses, that this connection means may take several different forms within the scope of my present invention. The only requirement is that this connection means provide for pivotal or swiveling movement of each of the second and third arms relative to the first arm. Preferably, it is advisable to have the distal end portions of the three support arms connected together at generally the same location, i.e., a common connection area or point to provide firm support of the mirror head against movement rectilinearly in all directions and rotationally about all axes.

Other objects and features of the present invention will become apparent as this description progresses.

To the accomplishment of the above and related objects, this invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIGS. 2–7 are fragmentary sectional views showing different mechanisms for connecting the proximal end portions of the support arms of my structure to the vehicle for swiveling movement relative to the vehicle;

FIG. 8 is a fragmentary perspective view showing one illustrative means for holding the support arms in their storage position;

FIG. 9 is a fragmentary sectional view of the means for connecting the distal end portions of the support arms together;

FIG. 10 is a fragmentary sectional view of the means for connecting the support arms together and holding them in their storage position on the vehicle; and FIG. 11 is a fragmentary sectional view taken generally along the line 11—11 in FIG. 9.

Figure 1:
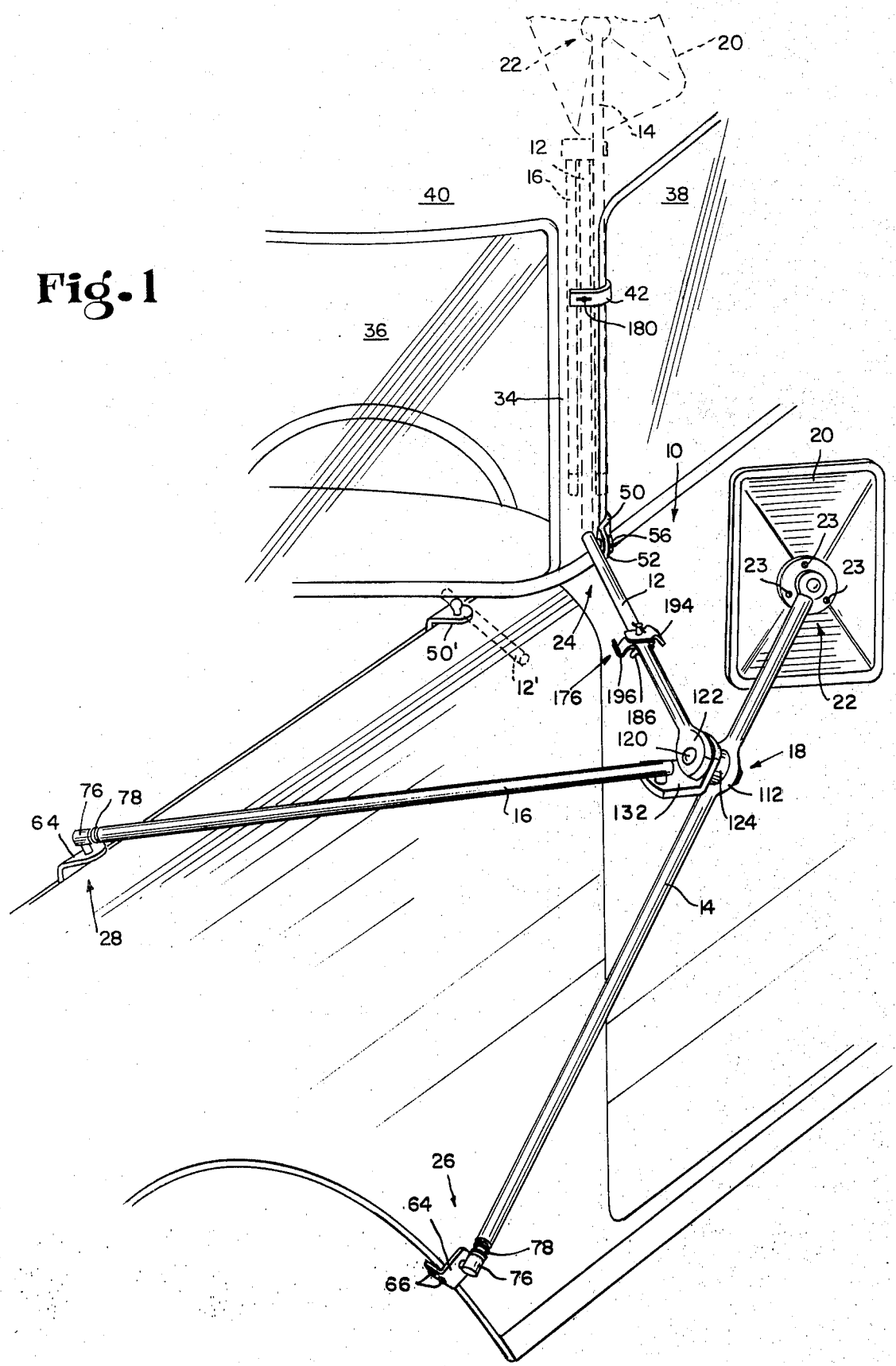
FIG. 1 is a fragmentary perspective view of a vehicle with my mirror structure mounted thereon.

Referring now to the drawings, and particularly to FIG. 1, it will be seen that my mirror structure, indicated generally by the reference numeral 10, comprises first, second and third elongated, rod-like support arms 12, 14, 16, each having a proximal end portion adjacent the vehicle and a distal end portion. First means, indicated generally at 18, is provided for connecting the distal end portions of the arms 12, 14, 16 together. A mirror 20 is provided, the mirror being connected by a second connection means 22 to the distal end of the arm 14. The connection means 22 is a conventional adjsutable adjustable connection including means such as the screws 23 for locking the mirror 20 in a fixed adjusted position relative to the arm 14. Third, fourth, and fifth connection means 24, 26, 28 are provided for, respectively, connecting the proximal end portions of the arms 12, 14, 16 to the vehicle. The proximal end portion of the first arm 12 is connected to the vehicle at a first point adjacent the base of the conventional post 34 between the windshield 36 and driver's window 38, the roof of the vehicle being indicated at 40. The proximal end portion of the second arm 14 is connected to a second point on the vehicle forwardly of and below the first point. In most conventional vehicles, it is convenient to place this second point at the front wheel well edge of the front fender as illustrated in FIG. 1. Then, the proximal end portion of the third arm is connected to the vehicle at a third point spaced forwardly of the first point and above the second point. Preferably, this third point, or the connection made at 28, will be located either directly above the second point (connection 26) or spaced forwardly of the second point. When the structure is being assembled on the vehicle to provide the maximum displacement of the mirror 20 from the vehicle, the third point (connection 28) is placed directly above the second point (connection 26). It wll be appreciated that, as the connection 28 is moved forwardly relative to the connection 26, the mirror 20 will be moved inwardly toward the vehicle.

In the structure 10, each of the arms 12, 14, 16 may preferably be a rigid, rod-like arm pivotally or swivelly connected at its proximal end to the vehicle and pivotally or swivelly connected at its distal end to the other two arms such that the displacement of the mirror 20 from the vehicle is determined by the positioning of the said first, second and third points. The first connection means 18 is a jointed connection such that each arm 12, 14, 16 can move relative to the other two arms to accommodate the positioning of the first, second and third points.

In the illustrative embodiment, as will be more fully discussed hereinafter, the distal ends of the arms 12, 16 are connected to the distal end portion of the arm 14, i.e., to a point on the arm 14 spaced from its distal end to which the mirror 20 is connected. For this reason, in this description as well as in the claims appended hereto, the language "means for connecting the distal end portions of the arms together" is intended to refer to the distal ends of the arms as well as the portions of the arms adjacent their distal ends.

Referring to FIG. 10, as well as to FIG. 1, it will be seen that there is a bracket 42 mounted on the post 34 by means such as the illustrated sheet metal screws 44. This bracket 42 serves a function which will be explained hereinafter. Another bracket 50 is connected to the base of the post in a similar manner, this bracket 50 providing a flange portion 52 extending generally in the direction of the first arm 12. The proximal end of the first arm 12 is connected to this bracket portion 52 by means such as the illustrated connector member 56. Thus, the connection 24 is made at a point adjacent the base of the post 34. In some embodiments, particularly in the nonself-storing embodiments, it may be advisable to put the bracket 50 at the top rear edge of the fender adjacent the base of the post 34, such a bracket being indicated in FIG. 1 by the reference numeral 50'.

In the self-storing embodiment of the present invention, the third connection means 24 is a permanent jointed connection, preferably a three-dimensional swivel connection, such that the arm 12 is swingably movable from its outwardly-extending use position to its upwardly-extending storage position generally parallel to the post 34 shown in phantom in FIG. 1. It may be advisable to have the arm 12 extend forwardly above the fender in its storage position on some vehicles. In the nonself-storing embodiment of the present invention, the third connection means 24 is a quick release connection means of a type to be discussed hereinafter. In both embodiments, the fourth and fifth connection means 26, 28 are preferably quick-release three-dimensional swivel connections such that the proximal end portions of the second and third arms 14, 16 can be quickly manually disconnected from the vehicle.

Turning now to FIGS. 5, 6, and 7, it will be seen that I have shown three different techniques for making each of the connections 26, 28. Each connection means 26, 28 includes a fixed connector member adapted to be rigidly and permanently attached to the vehicle. Such a member is indicated by the reference numeral 64 in FIG. 5 and 64' in each of FIGS. 6 and 7. The connector members 64, 64' may be rigidly attached to the wheel well of the fender (connection 26) or to the upper portion of the fender adjacent the hood (connection 28) by means such as the illustrative sheet metal screws 66.

Each connection means 26, 28 also includes a cooperating relatively movable connector member attached to the proximal end portion of the associated arm 14, 16 for movement therewith.

In the embodiment of FIG. 5, a ball stud 68 has a shank portion extending through an aperture 70 in the bracket 64 and riveted in place as indicated at 72. The reduced proximal end portion of the arm 14, 16 is provided with a cavity 74 for receiving the ball 68. A sleeve 76 is slidably disposed on the end portion of the arm 14, 16, and a spring 78 is arranged to urge this sleeve 76 to the left as viewed in FIG. 5. The sleeve 76 is provided with an elongated opening 80 therein, the left-hand end of the opening being larger than the diameter of the ball 68 and the righthand end of the opening 80 being smaller than the diameter of the ball. A stop 82 is connected to the end of the arm 14, 16 by means such as the illustrated screw 84 to limit the movement of the sleeve 76 to the left. The structure just described is a conventional quick-release ball joint connection. When the sleeve is moved to the right against the urging of the spring 78 so that the ball 68 can be moved through the enlarged portion of the opening 80, the ball joint can be engaged or released. I have found that such ball joint connections are ideally suited for securing the proximal end portions of the arms 12, 14, 16. In FIG. 2a, I have shown the proximal end portion of the first arm 12 connected to the bracket 50 by such a ball joint structure.

Turning now to the embodiment of FIG. 6, it will be seen that the proximal end portions of the arms 14, 16 may be flattened as indicated at 86 and formed with a spherical opening 88 to capture a ball 90 therein. The ball 90, of course, may move swivelly relative to the arm 14, 16. The male shank 92 of a partial-turn fastener 94 extends through an opening in the ball 90 to engage a female socket 96 formed in the bracket 64'. Cross pins 98 are conventionally carried on the distal end of the shank 92 to prevent the shank from moving out of the socket 96 when the pins are extending in the direction opposite to the direction of elongation of the socket 96. In FIGS. 6 and 7, I show the cross pins 98 in broken lines in their releasing positions, i.e., the direction which will permit movement of the pins through the slots 96. It will be appreciated that the arm 14, 16 may swivel relative to the bracket 64' when the members of the partial-turn fastener are engaged.

Referring now to the embodiment of FIG. 7, it will be seen that the flattened end portion 86 is provided with an opening 102 for receiving a rubberoid or rubber-like grommet 104 having an axially extending opening for receiving the shank 92 of the partial-turn fastener 94. In the embodiment of FIG. 7, the grommet 104 is resilient to permit swiveling movement of the partial-turn fastener 94 in the unfastened state relative to the arm 14, 16, yet firm enough when compressed by the locking action of the partial-turn fastener in the fastened state to make a sufficiently solid joint.

It will be appreciated that partial-turn fasteners are well known means for making quickly releasable and engageable connections. The female socket 96 of such fasteners are usually elongated slots having enlarged portions intermediate their ends for receiving the shank 92. When the cross pins 98 extend in the direction of the slot 96, the pins can pass through the slot. Then, when the pins are turned 90° as illustrated in FIGS. 6 and 7, the pins prevent the shank 92 from moving upwardly. Conventionally, the member providing the socket 96 may also provide inclined ramps with notches for engaging and holding the cross pins 98 in their locking position. I prefer to use SOUTHCO fasteners supplied by Southco, Inc., Lester, Pennsylvania 19113, and particularly the No. 2, one-fourth turn fasteners supplied by Southco, Inc.

Turning now to FIGS. 1, 9 and 11, the preferred first connection means 18 will be discussed. In the illustrative embodiment, the second arm 14 is flattened as indicated at 112 at its distal end portion. A hole 114 is pierced through this flattened portion 112 and a rivet 116 having headed ends 118, 120 extends through this opening. The distal end portion of the first arm 12 is flattened as indicated at 122 to be parallel to the flattened portion 112 and a plastic spacer or washer 124 is disposed therebetween. The shank of the rivet 116 extends through the washer 124 and an opening 126 pierced in the flattened portion 122. A portion 130 of a bracket 132 is disposed between the flattened portion 122 and the washer 124 as illustrated, the shank of the rivet 116 extending through an opening 134 in the bracket portion 130. Thus, in the illustrative embodiment, the first connection means 18 provides for pivotal movement of the arm 14 relative to the arm 12 about the axis of the rivet 16 as well as pivotal movement of the bracket 132 about the axis of the rivet 116. The spacer 124 separates the flattened portions 112, 122 so that the arm 14 can extend alongside and parallel to the arm 12 in the storage position.

A ball stud 136 is mounted on the bracket 132, the spherical portion of this stud being received in a generally spherical opening 138 formed in the proximal end portion of the third arm 16. The shank of the ball stud 136 extends through an opening 140 in the bracket 132 and is there riveted in place as illustrated. Thus, the arm 16 is swively movable relative to the bracket 132 which is pivotally movable relative to the arm 14 and the arm 12 about the axis of the rivet 116. The method of capturing the spherical portion of the ball stud 136 in the spherical opening 138 to provide a ball joint connection is conventional and well known.

In the self-storing embodiment, the proximal end portion of the first arm 12 is preferably swively connected to the bracket 50 while the distal end portion of the arm 16 is preferably swively connected to the bracket 132. Three types of such connections are shown, respectively, in FIGS. 2, 3 and 4, the ball joint connection of FIG. 2 being identical to the ball joint connection of FIGS. 9 and 11.

Turning to FIG. 3, it will be seen that the proximal end portion of the arm 12 or the distal end portion of the arm 16 may be flattened as indicated at 144 and provided with a spherical opening 146 which captures a ball 148 for swivelling movement. The shank 150 of a rivet extends through the ball 148 and an opening 152 in the bracket 50, 132. The rivet is provided with heads 154 which rigidly connect the ball 148 to the bracket 50, 132. Thus, the ball 148 serves swively to connect the arm 12, 16 to the bracket 50, 132.

Referring now to the embodiment of FIG. 4, it will be seen that the proximal end portion of the arm 12 or the distal end portion of the arm 16 is flattened as indicated at 160 and pierced to provide an opening 162 for receiving a rubber-like or rubberoid grommet 164 having a central opening therethrough. The shank of a rivet 166 extends through the central opening in the grommet 164 and an opening 168 in the bracket 50, 132. The ends of the rivet are headed as indicated at 170 to fasten the grommet to the bracket 50, 132 and preferably to capture washers 172 at opposite ends of the grommet. The resiliency of the grommet 164 will permit swivelling movement of the arm 12, 16 relative to its respective bracket 50, 132.

When the connection means 26, 28 are released, the first connection means indicated generally at 18 will permit the second and third arms 14, 16 swingably to move into storage position alongside and parallel to the first arm 12. Then, the three arms are swingably movable about the third connection means 24 to extend upwardly and generally parallel to the post 34. Sixth connection means, indicated generally by the reference numeral 176 in FIGS. 1, 8 and 10, is provided for fastening the arm 12 in its storage position. In the illustrative and preferred embodiments, the connection means 176 includes a partial-turn fastener which engages a female socket 180 formed in the bracket 42. In the illustrative embodiment, a central portion of the arm 12 is flattened as indicated at 182 and pierced to provide an opening receiving the male shank 184 of a partial-turn fastener 186. The distal portion of the shank 184 carries the conventional cross pins 188. In FIG. 10, I show the pin 188 in solid lines in its locking position and in broken lines in its releasing position.

In the embodiment of FIGS. 1 and 10, a pair of clamps 194, 196 is connected to the arm 12 and arranged respectively to engage and hold the arms 14, 16 securely to the arm 12 when the partial-turn fastener 186 is engaged as illustrated in FIG. 10.

In the embodiment of FIG. 8, a pair of spring-like clamps 200, 202 is fastened to the proximal end portion of the arm 12 and arranged receivably to engage the distal end portions, respectively, of the arms 14, 16 to hold the arms 14, 16 parallel to the arm 12 in its storage position.

I claim:

1. For use on a vehicle having conventional corner posts between its windshield and its front doors, an auxiliary rear view mirror structure comprising first, second and third elongated support arms, each arm having a proximal end portion and a distal end portion, first pivot means for connecting the distal end portions of said arms together, a mirror, second means for connecting said mirror to the distal end portion of one of said arms, third pivot means for connecting the proximal end portion of said first arm to such a vehicle at a first point adjacent the base of one of such posts, fourth pivot means for connecting the proximal end portion of said second arm to such a vehicle at a second point spaced forwardly of and below said first point, and fifth pivot means for connecting the proximal end portion of said third arm to such a vehicle at a third point spaced forwardly of said first point and above said second point, each of said fourth and fifth connection means including a fixed connector member adapted to be rigidly and permanently attached to such a vehicle and a cooperating relatively movable connector provided on the proximal end portion of the associated arm for movement therewith, said connector member and connector being releasably engageable, said third connection means being a jointed connection such that said first arm is swingably movable from an outwardly extending use position to an upwardly extending storage position alongside such a post, said second and third arms being movable, when said fourth and fifth connection means are released, to extend alongside said first arm in said storage position.

2. For use on a vehicle having conventional corner posts between its windshield and its front doors, an auxiliary rear view mirror structure comprising first, second and third elongated support arms, each arm having a proximal end portion and a distal end portion, first means for connecting the distal end portions of said arms together, a mirror, second means for connecting said mirror to the distal end portion of one of said arms, third means for connecting the proximal end portion of said first arm to such a vehicle at a first point adjacent the base of one of such posts, fourth means for connecting the proximal end portion of said second arm to such a vehicle at a second point spaced forwardly of and below said first point, and fifth means for connecting the proximal end portion of said third arm to such a vehicle at a third point spaced forwardly of said first point and above said second point, each of said fourth and fifth connection means including a fixed connector member adapted to be rigidly and permanently attached to such a vehicle and a cooperating relatively movable connector provided on the proximal end portion of the associated arm for movement therewith, said connector member and connector being releasably engageable, said third connection means being a jointed connection such that said first arm is swingably movable from an outwardly extending use position to an upwardly extending storage position alongside such a post, said first connection means providing pivotal connections such that, when said fourth and fifth connection means are released, said second and third arms are movable to extend alongside said first arm in said storage position, and sixth means for connecting said arms to such a post in said storage position.

3. The invention of claim 2 in which said sixth connection means includes a fixed connector member adapted to be securely and permanently attached to such a post, a movable connector member attached to a portion of said first arm intermediate its proximal and distal end portions, said connector members being releasably engageable to secure said first arm in said storage position, and clamp means for securing said second and third arms alongside said first arm in said storage position.

4. The invention of claim 3 in which said clamp means includes a pair of spring-like clamps carried on said first arm and proportioned and designed receivably to engage said second and third arms.

5. The invention of claim 3 in which said clamp means includes a pair of clamps carried on said first arm and proportioned and designed to engage said second and third arms, the last said movable connector member being cooperatively connected to said clamps and arranged to secure said clamps on said second and third arms when engaged with the last said fixed connector member.

6. For use on a vehicle having conventional corner posts between its windshield and its front doors, an auxiliary rear view mirror structure comprising first, second and third elongated support arms, each arm having a proximal end portion and a distal end portion, first means for connecting the distal end portions of said arms together, a mirror, second means for connecting said mirror to the distal end portion of one of said arms, third means for connecting the proximal end portion of said first arm to such a vehicle at a first point adjacent the base of one of such posts, fourth means for connecting the proximal end portion of said second arm to such a vehicle at a second point spaced forwardly of and below said first point, and fifth means for connecting the proximal end portion of said third arm to such a vehicle at a third point spaced forwardly of said first point and above said second point, each of said fourth and fifth connection means including a fixed connector member adapted to be rigidly and permanently attached to such a vehicle and a cooperating relatively movable connector provided on the proximal end portion of the associated arm for movement therewith, said connector member and connector being releasably engageable, said third connection means being a pivotal connection such that said first arm swings about said connection between an outwardly extending use position and an upwardly extending storage position alongside such a post and sixth means for connecting said arm to such a post.

7. For use on a vehicle having conventional corner posts between its windshield and its front doors, an auxiliary rear view mirror structure comprising first, second and third elongated support arms, each arm having a proximal end portion and a distal end portion, first means for connecting the distal end portions of said arms together, a mirror, second means for connecting said mirror to the distal end portion of one of said arms, third means for connecting the proximal end portion of said first arm to such a vehicle at a first point adjacent the base of one of such posts, fourth means for connecting the proximal end portion of said second arm to such a vehicle at a second point spaced forwardly of and below said first point, and fifth means for connecting the proximal end portion of said third arm to such a vehicle at a third point spaced forwardly of said first point and above said second point, each of said fourth and fifth connection means including a fixed connector member adapted to be rigidly and permanently attached to such a vehicle and a cooperating relatively movable connector provided on the proximal end portion of the associated arm for movement therewith, said connector member and connector being releasably engageable, said arms being generally straight, nonextensible, rod-like members, said third connection being a pivotal connection such that said first arm swings about said connection between an outwardly extending use position and an upwardly extending storage position alongside such a post, said first connection means providing pivotal connections such that, when said fourth and fifth connection means are released, said second and third arms are movable to extend generally parallel alongside said first arm in said storage position.

8. The invention of claim 7 including sixth means for connecting said arms to such a post.

9. For use on a vehicle having conventional corner posts between its windshield and its front doors, an auxiliary rear view mirror structure comprising first, second and third elongated support arms, each arm having a proximal end portion and a distal end portion, first means for connecting the distal end portions of said arms together, a mirror, second means for connecting said mirror to the distal end portion of one of said arms, third means for connecting the proximal end portion of said first arm to such a vehicle at a first point adjacent the base of one of such posts, fourth means for connecting the proximal end portion of said second arm to such a vehicle at a second point spaced forwardly of and below said first point, and fifth means for connecting the proximal end portion of said third arm to such a vehicle at a third point spaced forwardly of said first point and above said second point, each of said fourth and fifth connection means including a fixed connector member adapted to be rigidly and permanently attached to such a vehicle and a cooperating relatively movable connector provided on the proximal end portion of the associated arm for movement therewith, said connector member and connector being releasably engageable, said mirror being connected by said second connection means to the distal end of said second arm, said first connection means including means for connecting the distal end portion of said second arm to the distal end of said first arm for pivotal movement about an axis perpendicular to said first arm and means for connecting the distal end of said third arm to the distal end of said first arm for three-dimensional swiveling movement relative to the first arm.

10. The invention of claim 9 in which said arms are generally straight, said pivotal axes being disposed such that, when said fourth and fifth connection means are released, said second and third arms are movable thereabout to positions generally parallel to and alongside said first arm.

11. The invention of claim 10 including means for securing said second and third arms in their positions alongside said first arm.

12. The invention of claim 11 in which said third connection means provides a pivotal connection such that said first arm is swingably movable between an outwardly extending use position and an upwardly extending storage position alongside such a post, said second and third arms being swingably movable with said first arm.

13. The invention of claim 11 in which said third connection means includes a fixed connector member adapted to be permanently attached to such a vehicle and a cooperating relatively movable connector provided on the proximal end portion of said first arm for movement therewith, said connector member and connector being releasably engageable whereby said first, second and third arms can be disconnected from such a vehicle.

14. For use on a vehicle having conventional corner posts between its windshield and its front doors, an auxiliary rear view mirror structure comprising first, second and third elongated support arms, each arm having a proximal end portion and a distal end portion, first means for connecting the distal end portions of said arms together, a mirror, second means for connecting said mirror to the distal end portion of one of said arms, third means for connecting the proximal end portion of said first arm to such a vehicle at a first point adjacent the base of one of such posts, fourth means for connecting the proximal end portion of said second arm to such a vehicle at a second point spaced forwardly of and below said first point, and fifth means for connecting the proximal end portion of said third arm to such a vehicle at a third point spaced forwardly of said first point and above said second point, each of said fourth and fifth connection means including a fixed connector member adapted to be rigidly and permanently attached to such a vehicle and a cooperating relatively movable connector provided on the proximal end portion of the associated arm for movement therewith, said connector member and connector being releasably engageable, said third, fourth and fifth connection means being, respectively, three-dimensional swivel connections.

15. The invention of claim 14 in which each said fixed connector member is a generally spherically shaped ball stud, each said movable connector providing a socket for receiving its associated stud.

16. For use on a vehicle having conventional corner posts between its windshield and its front doors, an auxiliary rear view mirror structure comprising first, second and third elongated support arms, each arm having a proximal end portion and a distal end portion, first means for connecting the distal end portions of said arms together, a mirror, second means for connecting said mirror to the distal end portion of one of said arms, third means for connecting the proximal end portion of said first arm to such a vehicle at a first point adjacent the base of one of such posts, fourth means for connecting the proximal end portion of said second arm to such a vehicle at a second point spaced forwardly of and below said first point, and fifth means for connecting the proximal end portion of said third arm to such a vehicle at a third point spaced forwardly of said first point and above said second point, each of said fourth and fifth connection means including a fixed connector member adapted to be rigidly and permanently attached to such a vehicle and a cooperating relatively movable connector provided on the proximal end portion of the associated arm for movement therewith, said connector member and connector being releasably engageable, each said fixed connector member being a female socket for a partial-turn fastener, each said movable connector being a mating male shank for the partial-turn fastener.

17. The invention of claim 16 including swivel joint means for connecting said shank to the proximal end portion of its associated arm.

18. The invention of claim 17 in which said swivel joint means includes a rubber-like grommet attached to the proximal end portion, said shank being received in said grommet.

19. The invention of claim 17 in which said swivel joint means includes a spherical ball captured in the proximal end portion for swiveling movement, said shank being carried by said ball for swiveling movement.

20. For use on a vehicle, an auxiliary rear view mirror structure comprising first, second and third elongated support arms, each arm having a proximal end portion and a distal end portion, first means for connecting the distal end portions of said arms together, a mirror, second means for connecting said mirror to the distal end portion of one of said arms, third arms for connecting the proximal end portion of said first arm to such a vehicle at a first point thereon, fourth means for connecting the proximal end portion of said second arm to such a vehicle at a second point spaced forwardly of and below said first point, and fifth means for connecting the proximal end portion of said third arm to such a vehicle at a third point spaced forwardly of said first point and above said second point, each of said fourth and fifth connection means including a fixed connector member adapted to be rigidly and permanently attached to such a vehicle and a cooperating relatively movable connector provided on the proximal end portion of the associated arm for movement therewith, said connector member and connector being releasably engageable, said third connection means providing a jointed connection such that said first arm is swingably movable from an outwardly extending use position to a storage position adjacent the vehicle, said first connection means providing pivotal connections such that, when said fourth and fifth connection means are released, said second and third arms are movable to extend alongside said first arm in said storage position, means for holding said first, second and third arms in said storage positions.

21. The invention of claim 20 in which said third, fourth and fifth connection means are, respectively, three-dimensional swivel connections.

22. The invention of claim 20 in which each said fixed connector member is a generally spherically shaped ball stud, each said movable connector providing a socket for receiving its associated stud.

23. The invention of claim 20 in which each said fixed connector member is a female socket for a partial-turn fastener, each said movable connector being a mating male shank for the partial-turn fastener.

24. The invention of claim 23 including swivel joint means for connecting said shank to the proximal end portion of its associated arm.

25. The invention of claim 22 in which said third connection means includes means providing for three-dimensional swiveling movement of said first arm relative to such a vehicle when said fourth and fifth connection means are released.

26. The invention of claim 23 in which said third connection means includes means providing for three-dimensional swiveling movement of said first arm relative to such a vehicle when said fourth and fifth connection means are released.

27. For use on a vehicle, an auxiliary rear view mirror structure comprising first, second and third elongated support arms, each arm being a rigid, nonextensible, rod-like member having a proximal end portion and a distal end portion, first pivot means for connecting the distal end portions of said arms together, a mirror, second means for connecting said mirror to the distal end portion of one of said arms, third universal joint means for connecting the proximal end portion of said first arm to such a vehicle at a first point, fourth universal joint means for connecting the proximal end portion of said second arm to such a vehicle at a second point, and fifth universal joint means for connecting the proximal end portion of said third arm to such a vehicle at a third point, each of said connection means including a fixed connector member adapted to be rigidly and permanently attached to such a vehicle and a cooperating relatively movable connector provided on the proximal end portion of the associated arm for movement therewith, said cooperating connector members and connectors being releasably engageable.

28. The invention of claim 27 in which each said fixed connector member is a generally spherically shaped ball stud, each said movable connector providing a socket for receiving its associated stud.

29. The invention of claim 27 in which each said fixed connector is a female socket for a partial-turn fastener, each said movable connector being a mating male shank for the partial-turn fastener.

30. The invention of claim 1 in which said third point is spaced forwardly of said second point.

31. The invention of claim 20 in which said third point is spaced forwardly of said second point.

* * * * *

PO-1050
(5/69)

UNITED STATES PATENT OFFICE
CERTIFICATE OF CORRECTION

Patent No. 3,831,896              Dated  August 27, 1974

Inventor(s)  Clarence C. Owens

It is certified that error appears in the above-identified patent and that said Letters Patent are hereby corrected as shown below:

Column 4, cancel line 48 and substitute -- adjustable swivel connection including means such --.
Column 5, line 6, correct the spelling of -- will --.
Column 12, line 64 (Claim 20, line 7), cancel "third arms" and substitute -- third means --.

Signed and sealed this 7th day of January 1975.

(SEAL)
Attest:

McCOY M. GIBSON JR.
Attesting Officer

C. MARSHALL DANN
Commissioner of Patents